United States Patent [19]

Rosario

[11] Patent Number: 5,370,243
[45] Date of Patent: Dec. 6, 1994

[54] STORAGE DEVICE FOR COMPACT DISC CASES

[75] Inventor: David C. Rosario, San Francisco, Calif.

[73] Assignee: John C. Toves, San Jose, Calif.

[21] Appl. No.: 74,938

[22] Filed: Jun. 10, 1993

[51] Int. Cl.⁵ .............................................. A47F 7/00
[52] U.S. Cl. ...................................... 211/40; 211/194
[58] Field of Search .......................... 211/40, 41, 194; 312/9.47, 9.52, 9.55

[56] References Cited

U.S. PATENT DOCUMENTS

| | | | |
|---|---|---|---|
| 2,499,221 | 2/1950 | Hinsdale | 211/40 |
| 3,635,350 | 1/1972 | Wolf | 211/40 |
| 3,920,125 | 11/1975 | Weinstein | 211/194 X |
| 5,048,702 | 9/1991 | Maloney | 211/194 |
| 5,054,626 | 10/1991 | Stempinski | 211/40 |
| 5,072,835 | 12/1991 | Price, Jr. et al. | 211/40 |
| 5,117,984 | 6/1992 | Kennedy | 211/41 |
| 5,158,187 | 10/1992 | Taub | 211/186 |
| 5,186,338 | 2/1993 | Boutet | 211/41 |
| 5,188,240 | 2/1993 | Marino et al. | 211/41 |
| 5,191,983 | 3/1993 | Hardy | 211/40 |
| 5,195,642 | 3/1993 | Dardashti | 211/41 |
| 5,215,775 | 6/1993 | Hoffman, Jr. | 211/194 X |

*Primary Examiner*—Ramon O. Ramirez
*Assistant Examiner*—Sarah L. Purol

[57] ABSTRACT

A modular storage device for compact disc cases having a plurality of interconnecting frame units including separating members to provide parallel separation between frame units and provided with interconnecting male and female elements permitting the formation of a complete storage device of indeterminate, variable, and adjustable length in which the frame units can be joined together and used in a vertical or horizontal orientation.

2 Claims, 5 Drawing Sheets

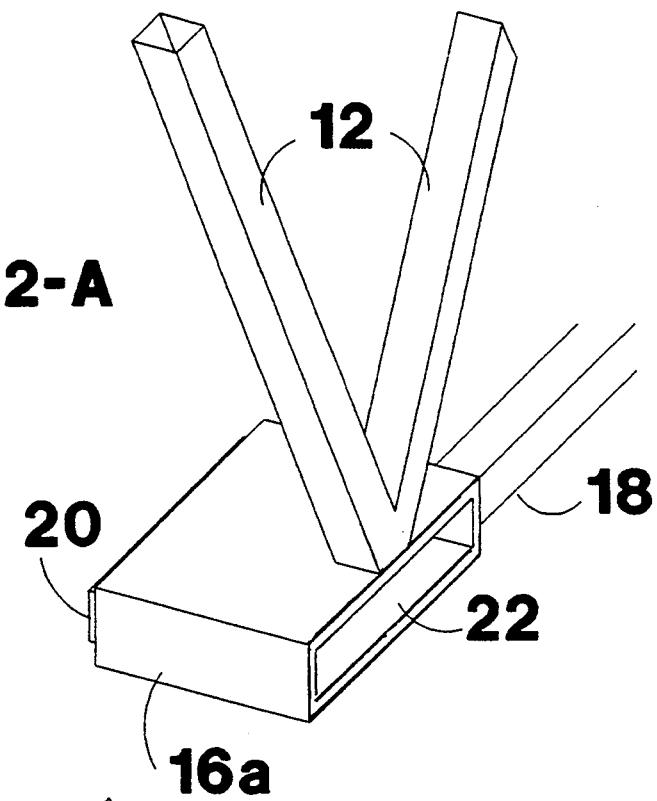
FIGURE 2-A
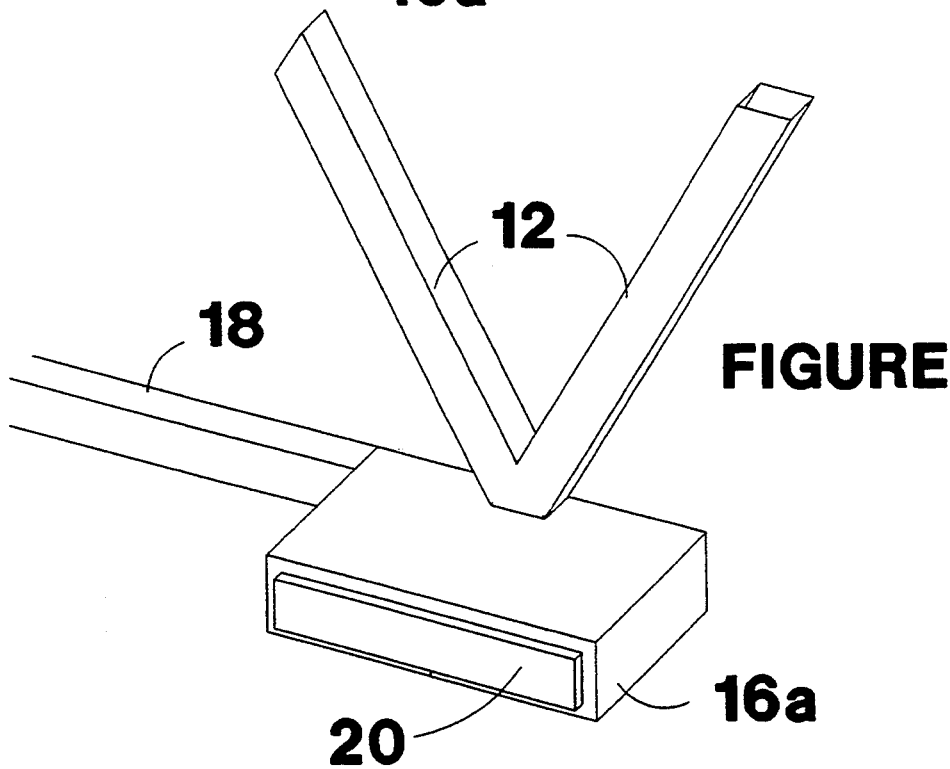
FIGURE 2-B

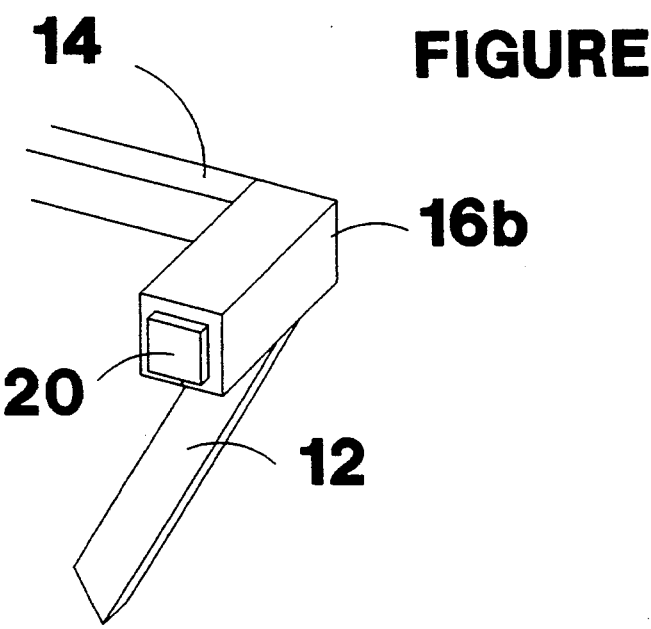
FIGURE 2-C
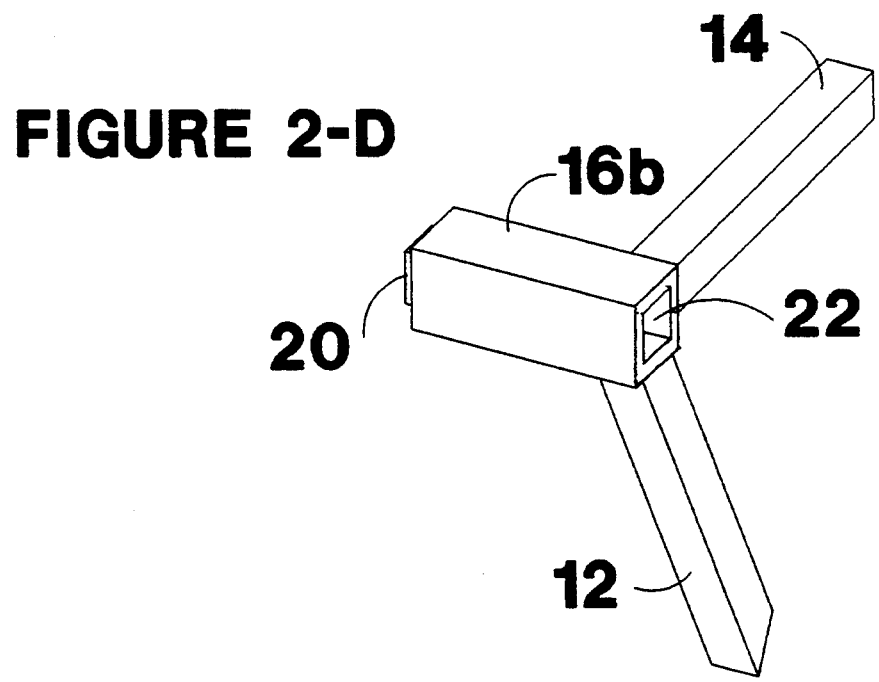
FIGURE 2-D

STORAGE DEVICE FOR COMPACT DISC CASES

BACKGROUND-FIELD OF INVENTION

The present invention is directed to an improved storage rack device for compact disc cases, and more particularly to a storage rack constructed Of modules which may be expanded and can be used in either a vertical or horizontal orientation.

BACKGROUND-DESCRIPTION OF THE INVENTION

The storage and display of compact disc cases is a matter of concern :or the compact disc consumer. Compact discs are expensive, therefore most consumers prefer to maintain them in good condition. The compact disc is usually stored in a thin rigid plastic case which has become standardized in the recording industry. While racks consisting of interconnecting compartments have been devised, there has not been developed a storage rack that provides open display, and ready access of the compact disc case. U.S. Pat. No. 3,635,350 discloses a modular cassette tape storage rack utilizing panels which are connected by male and female snap-in elements. This rack can be built to any desired length and oriented in either vertical or horizontal directions. The patent further discloses modular storage units which have sidewalls and endwalls, and are open on only one side for cassette insertion. These units are interconnected by male and female elements, which are, respectively, snap-in type buttons extended from and openings in, the sidewalls. The modular cassette tape storage rack also utilizes hooks and U-shaped elements which are inserted into slots in the endwalls and sidewalls as a means for interengagement of the cassette storage units.

The present invention has several differences, improvements, and advantages over the previously described cassette tape storage rack. First, the cassette rack is enclosed on all but one side, making it difficult to see the stored item. Also, being enclosed the storage rack can collect dust and other contaminants that can detrimentally affect the sound quality of a compact disc stored in said unit. The present invention is composed of modular frame units, consisting of two parallel end rails which are held together in a spaced parallel orientation by at least one transverse rail. The frame unit has openings on all six sides for easier identification of the stored CD. The present invention is easier to clean for dust and foreign particles as its open construction allows for access to all portions of the frame.

Second, the cassette rack units are in essence, boxes requiring a manufacturing process in which separate parts muse be attached to each other. This process requires not only the production of these separate parts, but also the additional step of correctly attaching these separate parts to each other.

The present invention on the other hand, provides for a frame unit which can be entirely molded or stamped at one time, reducing quality-control difficulties. The design of the present invention provides for a reduction in the requirement of raw materials, thus the present invention can be manufactured in a manner that is more economical and environmentally responsible than the cassette rack.

Third, the cassette storage rack is formed by stacking the storage boxes on each other, interconnecting the male and female elements or locking the boxes together with a hook-and-slot arrangement. In order to modify the cassette rack for insertion of, for example, videocassette tapes, all of the end and sidewalls would need to be separately modified in size. The present invention discloses frame units which are maintained in a spaced parallel orientation by spacer members which are mounted on the frame. The male elements are buttons extending from the projecting ends of the spacer members. This design provides for easier modification to store items other than compact discs. Additional spacer units can be attached to frame mounted spacer members, providing for increased separation between parallel frame units, or the mold could be altered to provide a different size frame.

Lastly, U.S. Pat. No. 3,635,350 discloses several embodiments of the cassette storage units which are interconnected by hook-and-slots, or U-shaped elements and inwardly extending lips. The hook-and-slot construction of the cassette rack lends itself to bending and breakage. Once a hook has been broken, the unit is unusable. The U-shaped elements likewise lend themselves to being bent or broken. The improved rack does not require hooks-and-slots or U-shaped members and lips to interengage the individual units. This is done with snap-in buttons which are sized and shaped to be more resistant to breakage than hooks and U-shaped members utilized by the cassette rack.

The above cited considerations regarding the storage and display of compact disc cases makes it apparent that an improved design for storage of compact disc cases is desirable.

SUMMARY OF THE INVENTION

The improved modular storage rack according to the present invention is characterized by the fact that the dimensions of the storage system can be variably modified to accommodate particular dimensional needs. The storage rack is formed by a plurality of modular frame units which interconnect by means of male and female elements to form a complete holder of variable length or height. Separating members integral with the frame units keep the frames in a spaced parallel relationship. This modular system can operate and be expanded in both horizontal and vertical orientations, providing the consumer with a useful storage rack to suit the consumer's particular space and storage requirements. The open frame design of this invention means that the stored items can be viewed from different sides for ease of identification. The open frame design also prevents dust and other possible contaminants from accumulating as is possible with a box-style storage rack. The design of this invention also reduces the need for raw materials, which means that the frame units can be easily and economically produced.

Still further objects and advantages will become apparent from the following description.

BRIEF DESCRIPTION OF THE DRAWINGS

FIG. 2a–2d depicts, in perspective, on a larger scale the spacer units for maintaining the frame of FIG. 1 in a spaced parallel relationship;

DESCRIPTION OF THE PREFERRED EMBODIMENT

Figure 1:
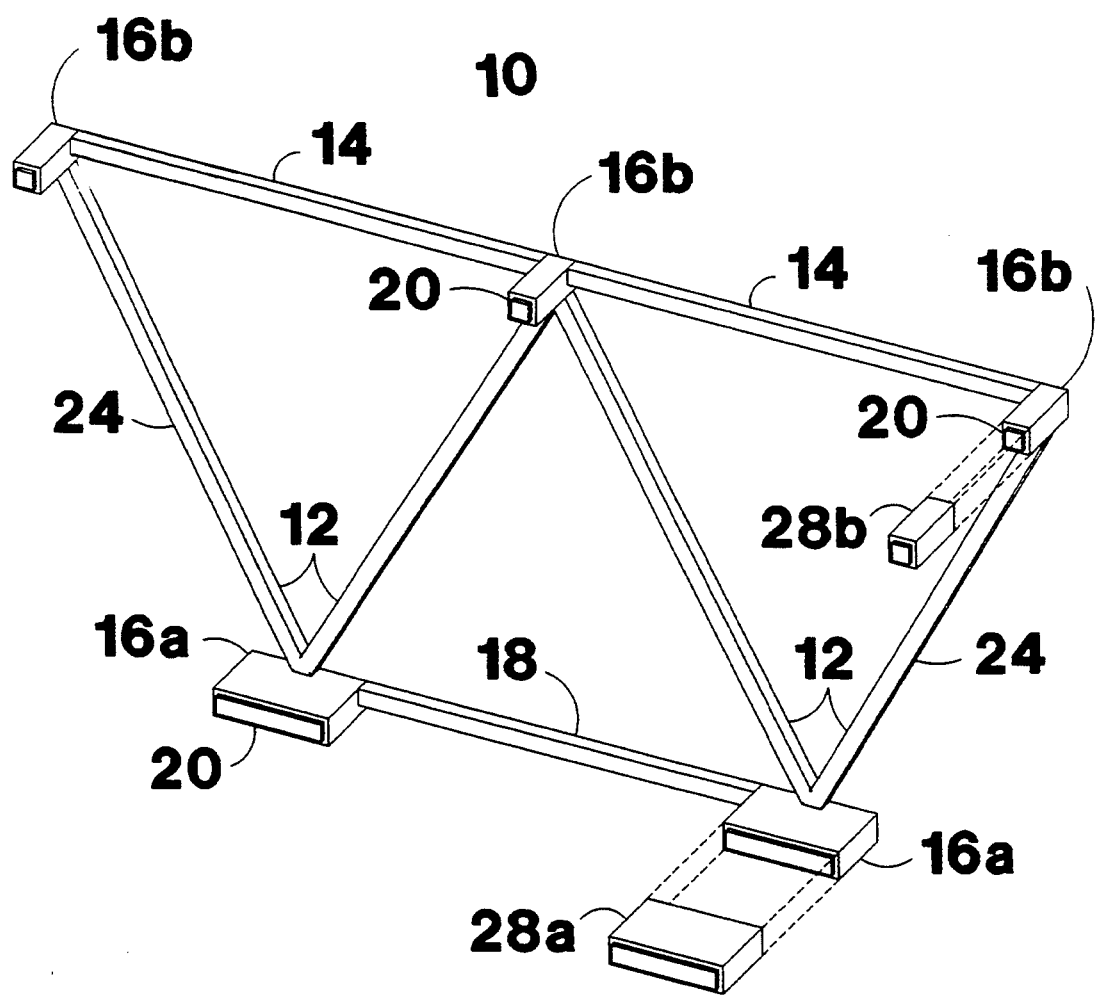
FIG. 1 depicts, in perspective, a frame unit contemplated in accordance with the invention.

In the drawings a modular frame unit 10 is depicted which consists of top rails 14 and a bottom rail 18 maintained in parallel spaced relation by diagonally extending transverse members 12. Spacer units or separators 16a, 16b project perpendicularly from the face of the frame 24. The spacer units 16a, 16b maintain the frame units 10 in a parallel, spaced relation when the frame units 10 are connected to form a rack in either a horizontal orientation as in FIG. 3, or when stacked one above the other in a vertical orientation as in FIG. 4.

Figure 3:
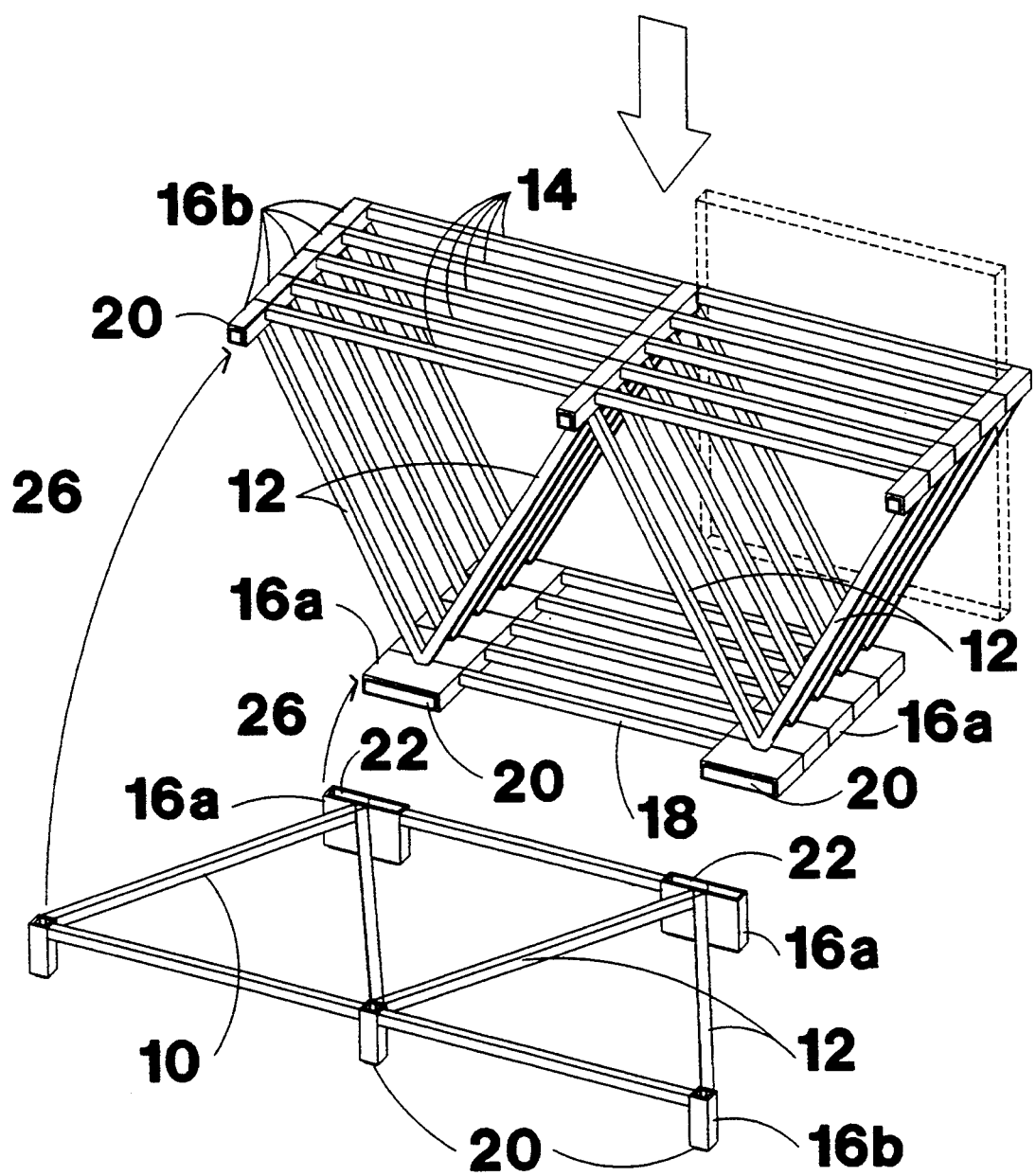
FIG. 3 depicts, in perspective, an assembled rack in accordance with the present invention in a horizontal orientation.
Figure 4:
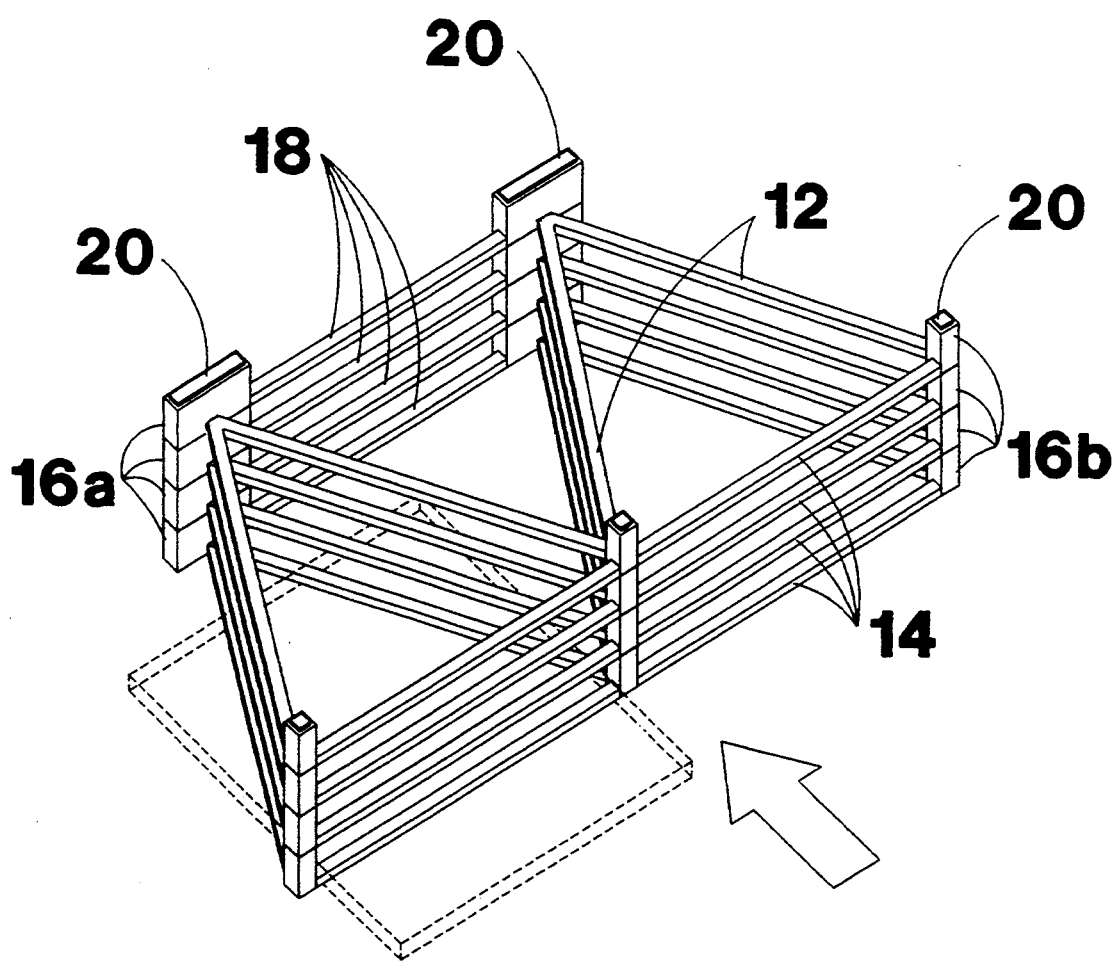
FIG. 4 depicts, in perspective, an assembled rack in accordance with the present invention in a vertical orientation.

The spacer units 16a are located at the intersection of the diagonally extending transverse members 12 and the bottom rail 18 is shown in FIG. 1. Additionally, spacer units 16b are located at the intersection of the diagonally extending members 12 and the top rails 14. As shown in FIGS. 3 and 4, the spacer units 16b provide for an unobstructed passage of a compact disc case to an article retaining space as defined between two adjacent frames 10. The spacer units 16a defines the end of the article retaining space. Additional spacer units 28a, 28b as shown in FIG. 1 can be attached to spacers 16a, and 16b providing additional space between frame units as needed.

FIG. 2a-2d depicts, at an enlarged scale, the spacer units 16a, 16b shown in FIG. 1. The spacers 16a, 16b may be of any convenient Length to provide the necessary between frame clearance to accommodate the type of item being stored. The spacer units 16a, 16b is also provided with male elements 20 and female elements 22 being dimensioned and shaped to provide for interengagement as shown in FIG. 3.

FIG. 3 depicts a perspective view of an assembled storage rack in accordance with this invention in a horizontal orientation. As is demonstrated the modular frame units 10 are arranged in a spaced, parallel location by the spacer units 16a, 16b. When assembling one frame unit 10 with respect to the other, they are moved as indicated by arrows 26, and the respective male elements 20 will pass into respective mating female elements or openings 22 in a snap-together action and thereafter hold the individual frame units 10 in an assembled relationship as shown. FIG. 4 depicts a perspective view of an assembled storage rack in accordance with this invention, in a vertical orientation. As shown, the spacer units 16a, 16b hold the modular frame units 10 in a parallel spaced relationship with the male elements 20 and the female elements 22 interlocking to form columns supporting the frame units 10 and thereafter holding the frame units 10 in an assembled relationship as shown.

Numerous other variations of the present invention may be envisioned by those skilled in the art without departing from the spirit and scope of the present invention. For example, the dimensions of the frame can be modified to accommodate the storage of video tape cassettes, audio-tape cassettes, magazines or a variety of similarly shaped articles, the shape of the frame can be square, rectangular, circular, etc.. The present embodiments of this invention are thus to be considered in all respects as illustrative and not restrictive.

I claim:

1. A storage rack specifically dimensioned for compact discs, comprising a plurality of identical modular frame units, each of said units comprising a top rail, a parallel bottom rail, four transverse members connecting said top and bottom rails thereby holding them in a parallel spaced relationship and forming a frame, the top rail having spacer units located on each end of the rail and with a spacer unit located on the rail at the midpoint between the spacer units located at the ends, said top rail being dimensioned to permit one compact disc case to be inserted between each of the end spacer units and the center spacer unit, said top rail spacer units being male and female snap-in inter engaging and locking means projecting perpendicularly from the face of the frame with all the male elements oriented in the same direction as each other and with all of the female elements oriented in the same direction as each other, said male elements being snap-in type buttons extending from the projecting ends of the spacer units, and dimensioned and shaped to provide inter engagement with alternately arranged female elements of attached identical modular frame units, said femme elements being apertures defined by the opposite ends of the spacer units, said bottom rail further having spacer units located at each end of the rail, said bottom rail spacer units being male and female snap-in, inter engaging and locking means projecting perpendicularly from the face of the frame with all the male elements oriented in the same direction as each other and with all of the female elements oriented in the same direction as each other, said male elements being snap-in type buttons extending from the projecting ends of the spacer units, and dimensioned and shaped to provide inter engagement with alternately arranged female elements of attached identical modular frame units, said female elements being apertures defined by the opposite ends of the spacer units, said bottom rail spacer units further dimensioned to form support means to allow said frame unit to stand in a horizontal orientation and be supported upon said bottom rail spacer units, said top and bottom rail spacer units further forming columns to support the frames when stacked in a vertical orientation, said transverse members being attached to the top and bottom rail spacer units such that each of the two bottom rail spacer units is connected to an end spacer unit and the center spacer unit of the top parallel rail.

2. A storage rack for compact discs as in claim 1, further including additional spacer units comprising male and female inter engaging means as in claim 1, said additional spacer units not mounted upon a frame and said additional units further being dimensioned and shaped to attach to the frame mounted spacer units providing additional space between individual parallel frames.

* * * * *